(12) United States Patent
O'Donovan et al.

(10) Patent No.: US 6,396,908 B1
(45) Date of Patent: *May 28, 2002

(54) MESSAGE TRANSFER SYSTEM

(75) Inventors: John Joseph O'Donovan, Galway (IE);
Jeff Williams, Scarborough (CA);
Brian Cruickshank, Oakville (CA);
Lloyd Florence, Toronto (CA)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/184,530

(22) Filed: Nov. 2, 1998

Related U.S. Application Data

(63) Continuation-in-part of application No. 08/959,579, filed on Nov. 3, 1997, now abandoned.

(51) Int. Cl.$^7$ ................................................ H04M 1/64
(52) U.S. Cl. ................ 379/88.18; 379/67.1; 379/88.17; 379/88.22; 379/88.25; 379/908
(58) Field of Search .......................... 379/67.1, 69, 70, 379/84, 88.08, 88.13, 88.17, 88.18, 88.22, 88.25, 93.24, 100.08, 100.12, 201, 214, 220, 221, 234, 243, 900, 905, 908, 201.01, 214.01; 370/352, 353, 380, 389

(56) References Cited

U.S. PATENT DOCUMENTS

| | | | |
|---|---|---|---|
| 5,134,646 A | | 7/1992 | Carlson .......................... 379/67 |
| 5,265,033 A | | 11/1993 | Vajk ............................. 364/514 |
| 5,276,731 A | * | 1/1994 | Arbel et al. .................... 379/88 |
| 5,557,659 A | | 9/1996 | Hyde-Thomson ............. 379/88 |
| 5,572,578 A | | 11/1996 | Lin et al. .................. 379/88.18 |
| 5,608,786 A | * | 3/1997 | Gordon ......................... 379/100 |
| 5,610,910 A | * | 3/1997 | Focsaneanu et al. ......... 370/351 |
| 5,646,980 A | | 7/1997 | Carter et al. ............. 379/88.25 |
| 5,675,507 A | * | 10/1997 | Bobo, II .................. 364/514 R |
| 5,680,442 A | * | 10/1997 | Bartholomew et al. ..... 379/67.1 |
| 6,069,890 A | * | 5/2000 | White et al. ................. 370/352 |

* cited by examiner

Primary Examiner—Allan Hoosain
(74) Attorney, Agent, or Firm—Lee, Mann, Smith, McWilliams, Sweeney & Ohlson (57) ABSTRACT

An apparatus and method for transferring a message from a calling party to an unavailable telephonically called party. The method comprises the steps of inititating a call to the called party over a communications channel, identifying that the called party is not available and instructing the calling entity to record the message at the calling entity and after recording to transmit the message to the called entity as a data message via a data channel for reception by the called entity. The system reduces the use of the voice/telephone communications networks by allowing a voice message to be transmitted through data channels, reducing the amount of voice traffic on the voice communication lines. The fact that the original voice message was actually stored with the calling entity after the telephone voice communication had been discontinued is transparent to both the calling party and the called party. Greetings for the called party can be stored at a messaging system of the calling entity.

26 Claims, 12 Drawing Sheets

| TELEPHONE SWITCH ID | TELEPHONE NUMBERS | GREETINGS |
|---|---|---|
| A | 555-1212 | BUSY |
| | | NO ANSWER |
| | 555-1213 | BUSY |
| | | NO ANSWER |
| | ... | ... |
| | 555-1221 | BUSY |
| | | NO ANSWER |
| B | 556-1212 | BUSY |
| | | NO ANSWER |
| | 556-1213 | BUSY |
| | | NO ANSWER |
| | ... | ... |
| | 556-1221 | BUSY |
| | | NO ANSWER |
| C | 557-1212 | BUSY |
| | | NO ANSWER |
| | 557-1213 | BUSY |
| | | NO ANSWER |
| | ... | ... |
| | 557-1221 | BUSY |
| | | NO ANSWER |

FIGURE 10

| TELEPHONE SWITCH ID | DIGITALLY NETWORKED? |
|---|---|
| A | YES |
| B | NO |
| C | YES |
| D | YES |
| ... | ... |
| Q | NO |

MESSAGE TRANSFER SYSTEM

This application is a continuation-in-part of application Ser. No. 08/959,579, filed Nov. 3, 1997, now abandoned.

BACKGROUND OF THE INVENTION

The present invention relates to a method and apparatus for transferring messages between two remote parties. In particular, it relates to voice mail systems and in a preferred form, to a method of, in the event of a busy or no-answer condition, playing a greeting and recording a message locally then forwarding that message to the remote voice mail system of the called party via a data network.

Many telephone calls today do not achieve their intended objective of putting two parties into direct voice communication with each other. Usually, the calling party ends up leaving a voice message which is subsequently listened to by the called party. Voice mail systems serve the primary function of recording a message when the party for whom a call is intended does not answer the call in person.

In the event of an incoming call at a telephone switch of a system equipped with a voice mail system, the voice mail system may monitor the progress of the call. If the intended telephone is busy, or if the intended telephone is not answered after a predetermined number of rings, the voice mail system might answer the call and play a greeting. If the telephone is answered the voice mail system stops monitoring the call.

Each user of a voice mail system has an associated voice mailbox. The voice mailbox is used to store messages recorded as a result of the voice mail system answering incoming calls so that the user may review the messages at a later time. This mailbox may also store a greeting that is played when the voice mail system answers the call, or two greetings, one which is played in a busy situation and another which is played otherwise. In general, greetings may be recorded by the user and played in any arbitrary situation that is detectable by the voice mail system; another example is a specific greeting for a particular calling line ID. The greetings are usually recorded by the user, typically give possible reasons for not answering the call and often prompt the caller to leave a message. Reasons for not answering the call may include the line being busy with another call, or being unable to answer due to a brief or prolonged absence. The greeting may also give instructions for urgent matters.

In present day voice mail systems, the recording of both the outgoing greeting and incoming messages is accomplished digitally. A digitally recorded message may be stored, then addressed and sent to the voice mailbox of another user of the same voice mail system. This approach is referred to as "store and forward" messaging.

In some cases, voice mail systems in locations remote from each other are connected in a "store and forward" messaging digital network of voice mail systems. More particularly, a local user may record a message for a remote user and when the recording is complete, the local voice mail system can then communicate with the voice mail system on which the voice mailbox of the remote user resides in order to forward the message. This has the result of leaving a message in a remote user's voice mailbox just as a call answered by the remote voice mail system would have.

U.S. Pat. No. 5,572,578 issued Nov. 5, 1996 to Lin describes networked voice mail systems in which each voice. mail system (the "local" system) maintains a directory of information about the users of the other voice mail systems in the network (the "remote" systems). Such information is used for "store and forward" messaging and, for a given remote user, might include the remote user's spoken name, which allows for a spoken confirmation of the name of the voice mail recipient, and the remote user's ASCII name which can be used in "dial-by-name" addressing of the voice mail. The information is updated when a message is forwarded to a remote user and the remote system returns a message acknowledging receipt of the voice mail message.

In the case of a call to a remote location, long distance toll charges may apply related to the duration of the call. Such charges may be acceptable if the remote user answers the call personally but may be seen as expensive if it is only possible to leave a voice mail message. Had the calling party known that the called party was not going to be available, rather than using a normal voice telephone line the message could have been sent as a data transmission via e-mail or some other system and this would have had two benefits. The first benefit is that the communication would have been less expensive in view of the fact that the same amount of data could be transferred over a data communication path in less time than the voice message and secondly that the voice telephone line would be available for other communications.

SUMMARY OF THE PRESENT INVENTION

The present provides a method and apparatus whereby the fact that the called party is only available to receive a message is recognised and the communication path between the called and the calling party altered from a voice channel to a data channel. This is achieved by recording the message locally to the calling party, processing the message as a data message and sending it via the data channel to the called party where the message is reconstructed and awaits accessing by the called party.

In accordance with an aspect of the present invention there is provided a method for determining whether a remote voice mail system, is digitally networked to a local voice mail system. An unsuccessful attempt to reach to the remote party in person results in the local voice mail system performing voice mail tasks locally rather than at the remote voice mail system. In one embodiment, after a busy or no answer condition, the connection between the local and remote switches is dropped and the local user may be presented with the greeting of the remote user by the local voice mail system. In another embodiment, this greeting is played by the remote voice mail system before the connection between the local and remote telephone switches is dropped. In response to the greeting a message is recorded locally and forwarded to the voice mailbox of the remote user through the digital network.

A first aspect of the invention provides a method of transferring a message from a calling party at a calling entity to a called entity comprising the steps of:

initiating a call to a called party at the called entity over a communications channel;

identifying that the called party is not available; and recording the message at the calling entity and after recording transmitting the message as a data message via a data channel for reception by the called entity.

Preferably greetings associated with the called parties of the remote messaging system are stored by the local messaging system, and the method includes the step of, responsive to the instructing step, playing a greeting to at the local messaging system. This has an advantage of minimising the time that the call across the network needs to be held.

Another aspect of the present invention provides a messaging system for transferring a message from a calling party at a calling entity to a called party at a called entity comprising:

means for initiating a call to the called party at the called entity over a communications channel;

means for identifying that the called party is not available; and means for recording the message at the calling entity and after recording for transmitting the recorded message as a data message via a data channel for reception by the called entity.

A further aspect of the present invention provides a method for handling an incoming call at a called entity, the call being from a calling party at a calling entity, the method comprising the steps of:

receiving the incoming call at the called entity;

identifying that the called party is not available;

determining whether a local messaging system associated with the calling entity is capable of local recording and transmission of messages to a remote messaging system at the called entity;

if the determining step determines that the local messaging system is capable of local recording and transmission, instructing the local messaging system to record a message and after recording to transmit the message as a data message via a data channel for reception by the called entity.

A further aspect of the present invention provides apparatus for handling an incoming call at a called entity, the call being from a calling party at a calling entity, the apparatus comprising:

means for receiving the incoming call at the called entity;

means for identifying that the called party is not available;

means for determining whether a local messaging system associated with the calling entity is capable of local recording and transmission of messages to a remote messaging system at the called entity;

means instructing, if the determining step determines that the local messaging system is capable of local recording and transmission, the local messaging system to record a message and after recording to transmit the message as a data message via a data channel for reception by the called entity.

A further aspect of the present invention provides a method for handling an outgoing call from a calling party at a calling entity, the call being intended for a called party at a called entity, the method comprising the steps of:

receiving an instruction from the called entity for a local messaging system associated with the calling entity to record a message;

dropping the call with the called entity; and recording the message at the calling entity and after recording transmitting the message as a data message via a data channel for reception by the called entity.

A further aspect of the present invention provides an apparatus for handling an outgoing call from a calling party at a calling entity, the call being intended for a called party at a called entity, the apparatus comprising:

means for receiving an instruction from the called entity for a local messaging system associated with the calling entity to record a message;

means for dropping the call with the called entity; and means for recording the message at the calling entity and after recording transmitting the message as a data message via a data channel for reception by the called entity.

A still further aspect of the present invention provides a method of transferring a message from a calling party to a calling entity to a called entity comprising the steps of:

initiating a potential voice call to a called party at the called entity over a voice channel;

identifying that the called party is not available to speak and generating a signal indicative thereof, sending the signal to the calling entity as a result of said identification;

requesting the calling party to leave a voice message; and storing said voice message characterised in that the voice message is stored at the calling entity and after storage is forwarded to the called entity via a data channel for reception by the called party.

The call between the calling entity and the called entity can be initiated via the public switched telephone network. The advantage of using these methods and apparatus with such a call is that the time occupied by the calling party on an expensive voice telephone line is reduced to a minimum and in some cases there can be no charge for the voice part of the message transfer. Rather than using the expensive resources of the switched network, a data network is used instead. Further, by using a data path for processing a voice mail message, data compression can be used so that the message can be passed over the data path using a minimum time and consequently reducing the cost to a minimum.

The methods and apparatus according to the invention also have advantages where the call between the calling entity and called entity is via a data network, such as the internet, as would be the case where the calling entity and called entity are communicating using voice over internet techniques. By recording a message at a messaging system local to the calling entity, digital signal processing (DSP) resources of the gateways are freed for use with real-time calls. There is a further advantage that the quality of the recorded message and of voice prompts and greetings during the voice messaging session are improved because the session takes place local to the calling party.

The data message can be sent to the called entity, such as the voice mail system of the called party, or it can be sent to any other data reception device of the called party, e.g. an email address of the called party.

The proposed system can be fully automatic, simply requiring the passage of appropriate messages between the calling switching station and the called switching station so that the overall process is transparent to the users.

BRIEF DESCRIPTION OF THE DRAWINGS

In order that the present invention be more readily understood, an embodiment thereof will now be described by way of example with reference to the accompanying drawings in which.

DESCRIPTION OF PREFERRED EMBODIMENTS

Figure 1:
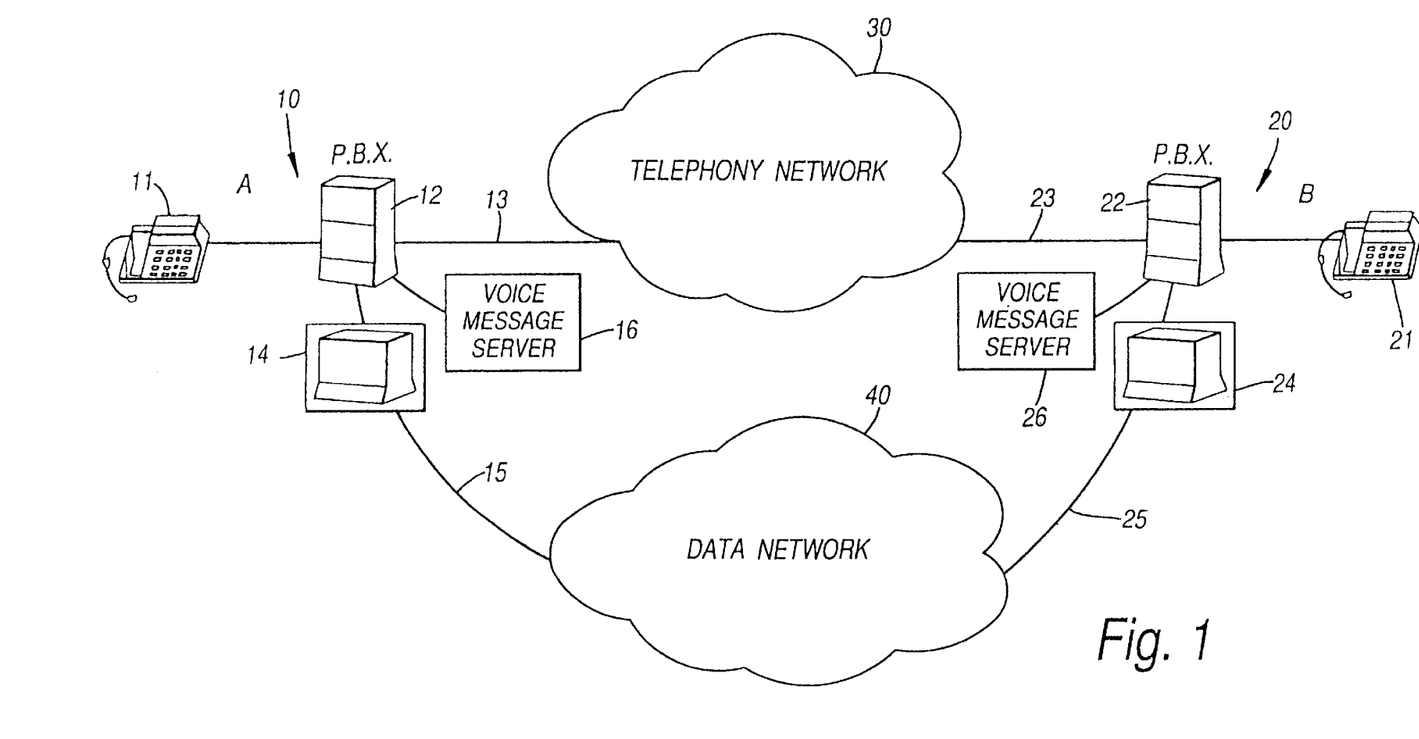
FIG. 1 shows a diagrammatic representation of a system according to the present invention.

Referring now to FIG. 1, this shows in diagrammatic form a message transfer system between a calling entity (10) and a called entity (20). The calling entity comprises a telephone set 11 connected to a switching system such as a digital PBX (12) which has access to a voice network 30 via a conventional voice channel or line (13). The switching system (12) is also connected to a data network access device 14 which is connected by a separate data channel or line (15) to a data network (40). The called entity has similar equipment namely a telephone set (21), a switching system (22) connected to the telephone network (30) via a normal voice channel or line (23), and a data network access device (24) connected to the data network (40) via a data channel or line (25).

Modern digital switching systems usually have provisions for handling voice mail i.e. messages for persons who have been unable to answer a telephone call. A voice mail server (16) is consequently shown connected to the switching system 12 and a further voice mail server (26) is shown connected to the switching system (22).

In a conventional system, voice mail is handled in the following manner. Firstly, an answer message is recorded in the voice mail server which is played to a caller should the called party be busy or unavailable. The answer message requests the caller to leave a message which is recorded by the voice mail server and an indication is given to the called party that there is a message waiting. The called party then accesses the message on the voice mail server. This system requires the caller to be connected to the voice mail server for the duration of the answer message and also the time taken to record the message for the called party. This can be expensive for long distance calls over a public network.

In contrast, in order to handle messages between the calling party (10) and the called party (20) the apparatus according to a preferred embodiment is designed to recognise when the called party (21) is in a position to receive only voice mail as opposed to a real time telephone call and causes the attempted voice communication via the lines (13,23) to be terminated and substitute therefor a data call via the data network (40) and the access devices (14,24). This is basically achieved by causing the voice mail message to be recorded at the calling entity side rather than at the called entity side as is the case in the conventional system. Two users who have voice mailboxes on the same voice mail system are said to be "local" to each other and two users who have voice mailboxes on different systems are considered "remote" from each other. Therefore, in FIG. 1, a user of the local voice mail system 16 is remote from a user of the remote voice mail system 26. Exactly how this is achieved will now be described.

Figure 2:
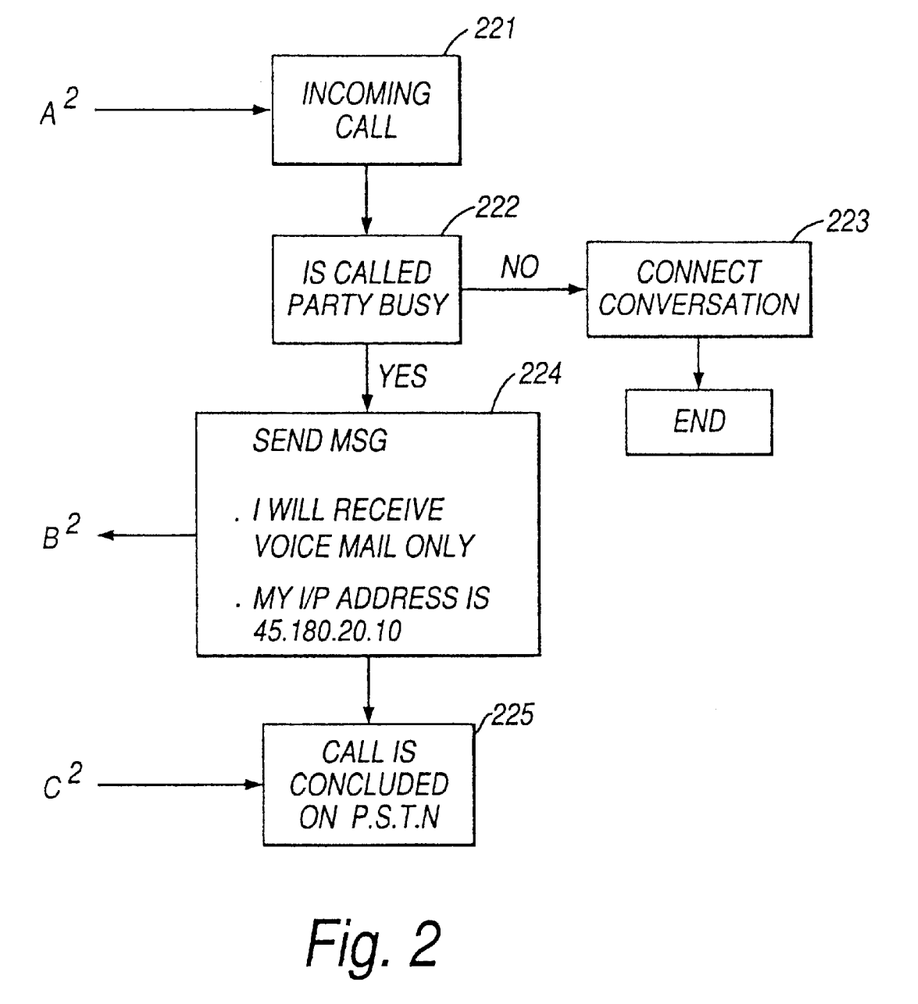
FIG. 2 shows a flow diagram of part of the overall sequence of operating the system of FIG. 1.

FIG. 2 shows, in flow chart form, the sequence of events which will occur at the called entity side (20). An incoming telephone call is indicated by the letter A and is received by the switching circuit (22). This is represented by the block (221). The switching circuit (22) has the ability to determine at block (222) whether the called party is busy or not answering his telephone. If the called party is available, the switching circuit (22) causes the incoming telephone call A to be connected to the telephone set (21) as indicated by the block (223). However, if the called party is not answering his telephone or is busy on another telephone call, this fact is recognised by the switching circuit (22) and this causes the switching circuit (22) to send a message represented by the letter B back down the normal voice lines (23,13) to the calling party indicating that no voice connection can be made. The message B is preferably structured to contain at least two pieces of information namely the indication that no voice connection can be made but also a data address for the called party. This message can be sent back one or more times until such time as a call termination signal C is received as indicated by block (225) whereupon the voice call is concluded. The usual format for calling line identification can be used in modified form for this With modern digital switching systems, the call is not connected until the called party answer signal is received and no call charges are incurred therefor. The position would be different if the initial call were answered by a switchboard operator and then passed to the appropriate telephone set.

Figure 3:
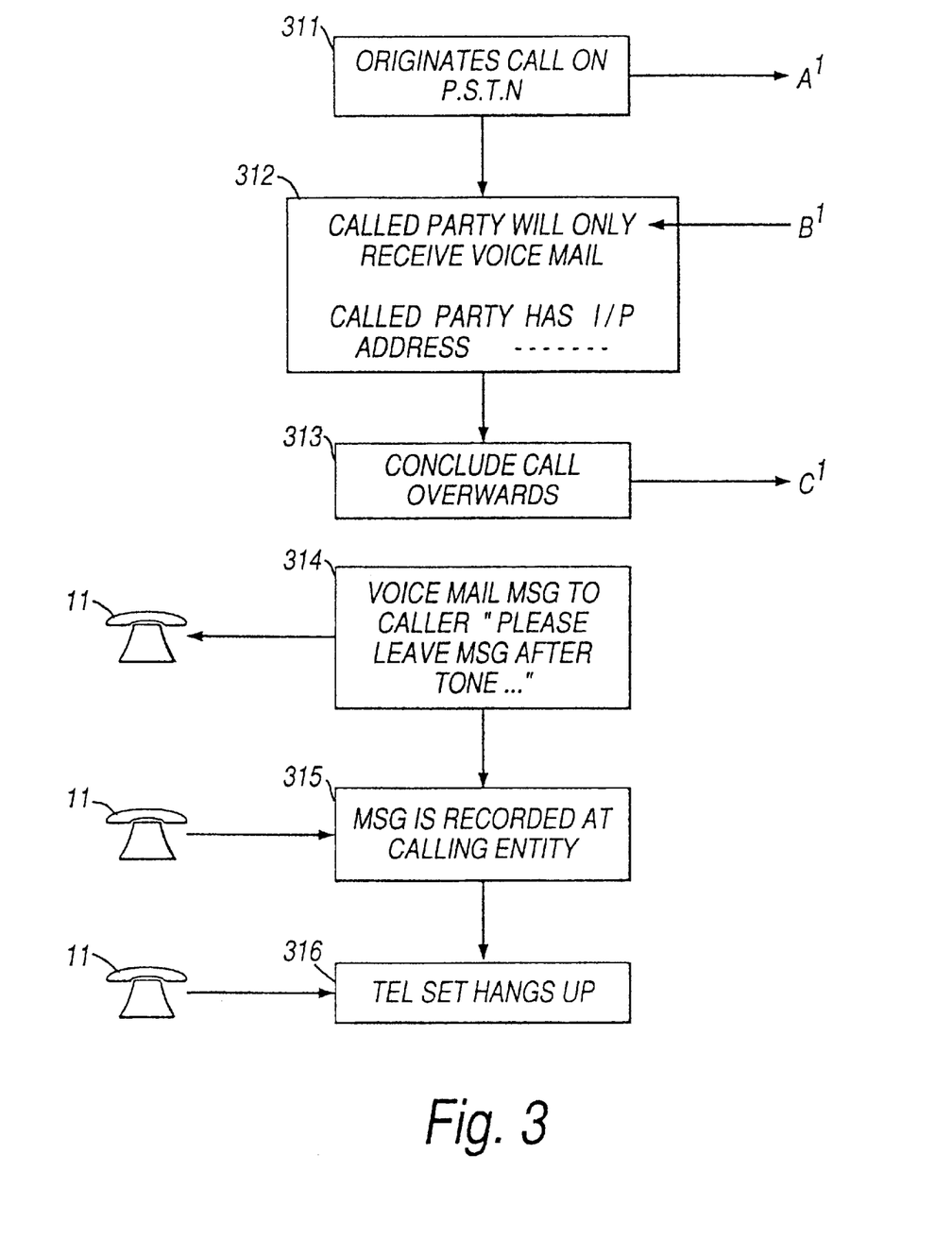
FIG. 3 is a further flow chart showing a further portion of the overall sequence of operating the system of FIG. 1.

Referring to FIG. 3, this shows a flow chart representing the sequence of events which takes place at the calling entity and the same letters have been allocated to the various messages as have been used in FIG. 2. In this case, the block (311) indicates that the calling entity has originated a call on the public switched telephone network. Thereafter, as indicated by block (312), the calling entity receives the message B indicating that the called party is not available and that voice mail should be used. Further the message also contains the data address of the called party. At this stage, the calling entity concludes the voice call as indicated by block (313) and as indicated by the message C. The next step in the sequence is the calling party is invited to leave a voice mail message as indicated by the block (314) and thereafter the message is recorded using the voice message server (16) at the calling entity as indicated by the block (315). After the caller has concluded his voice message, the caller hangs up as indicated by the block (316) and the initial sequence of events is concluded.

It will be appreciated that with the above described sequence of operations, the caller is not aware that he has left a message in the system at a location adjacent his telephone set. Further, while the request to leave a voice message has been described as being passed to him from the server 16 associated with his switching system (12) one could envisage that the voice link via the lines (13) and (23) could be opened and maintained for a time sufficient for the voice mail request message to be sent from server (26) associated with the called entity. This latter arrangement would in some circumstances provide the calling party with the comfort of hearing the voice of the called party as it is customary for users to record their own voice mail answer message.

Figure 4:
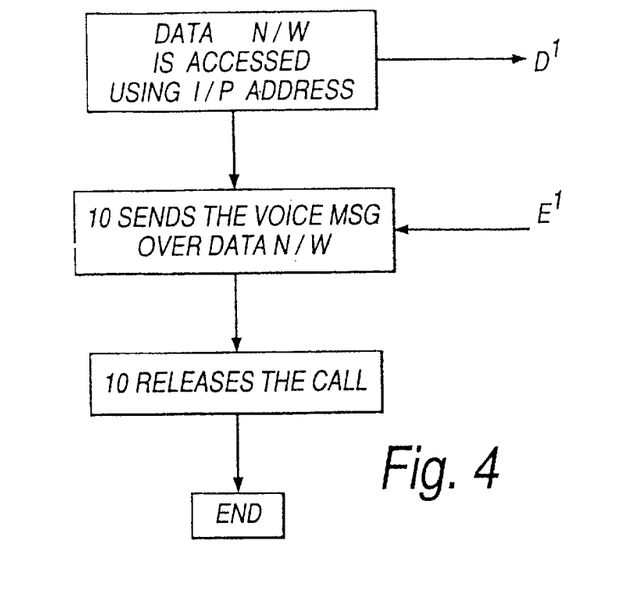
FIG. 4 is a further flow chart showing a further portion of the overall sequence of operating the system of FIG. 1.

Once the calling party has hung up, having left his voice mail message, the switching circuit (12) transfers the voice message to a data network access device (14) where the voice message is processed in order to be put on to the data network (40). The type of processing used is dictated by the actual data network concerned and could be voice over Internet or could be digitised and formed into packets for ATM distribution. Once the voice message is in a suitable form, the network access device (14) accesses the network as indicated in FIG. 4 using the network data address obtained via the message B and this data message is sent over the data network (40) to the corresponding data network access device (24) of the receiving entity as indicated by the message E in FIG. 4. Once the voice message has been transmitted, the data network access device releases the network connection and ends the communication. It is also possible for the voice message stored at the calling entity (10) to be erased at this time or some predetermined time thereafter.

Figure 5:
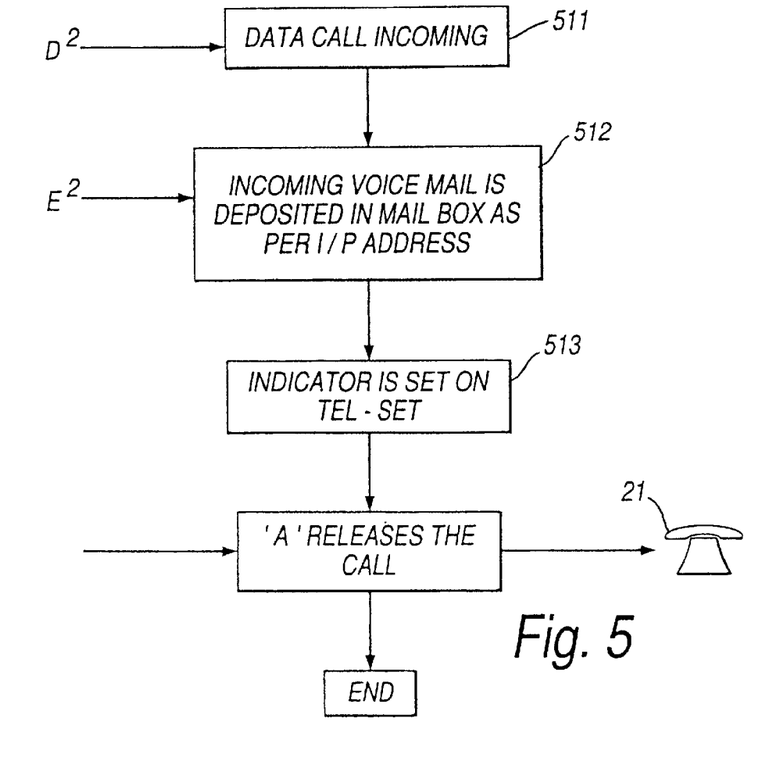
FIG. 5 is a further flow chart showing a further portion of the overall sequence of operating the system of FIG. 1.

Referring now to FIG. 5, this shows the data handling procedure at the receiving entity. Here the data network access device (24) receives the message D indicating that a data message is being delivered to it as indicated by the block (511) the device 24 then receives the incoming data message E and deposits the message in a mail box associated with the server (26) indicated by the data address associated with the message E as indicated by the block (512). The receipt of the message is indicated to the called party in some appropriate way either by a onscreen display or in some other way as indicated by the block (513). When the called party is ready to receive the message, he accesses the mail box in some convenient fashion for example by dialling up using his telephone set (21) to release the voice message which then concludes the overall messaging system.

From the above description, it will be appreciated that the messaging scheme is totally dynamic and the change in handling the voice mail message is transparent to both the calling and the called party. The above arrangement is suitable in many different situations and in fact can be used in conjunction with public telephony so that voice mail could be provided by public telephone companies to individual subscribers who may have ISDN lines without the subscribers requiring their own message recording and playback systems as is the case today. It is, of course, useful for large organisations which have both internal telephone networks and data networks. In either case, the main benefit is a reduction on the demands placed on the voice lines by making use of the larger capacity of the data network and the fact that data networks handle delay tolerant data much more efficiently.

A number of modifications to this basic system are possible. For example, the voice message could be stored at the calling entity (10) and only the indication that a voice message existed and its location need be sent to the called party. The message could then be relayed to the called party when required.

Figure 6:
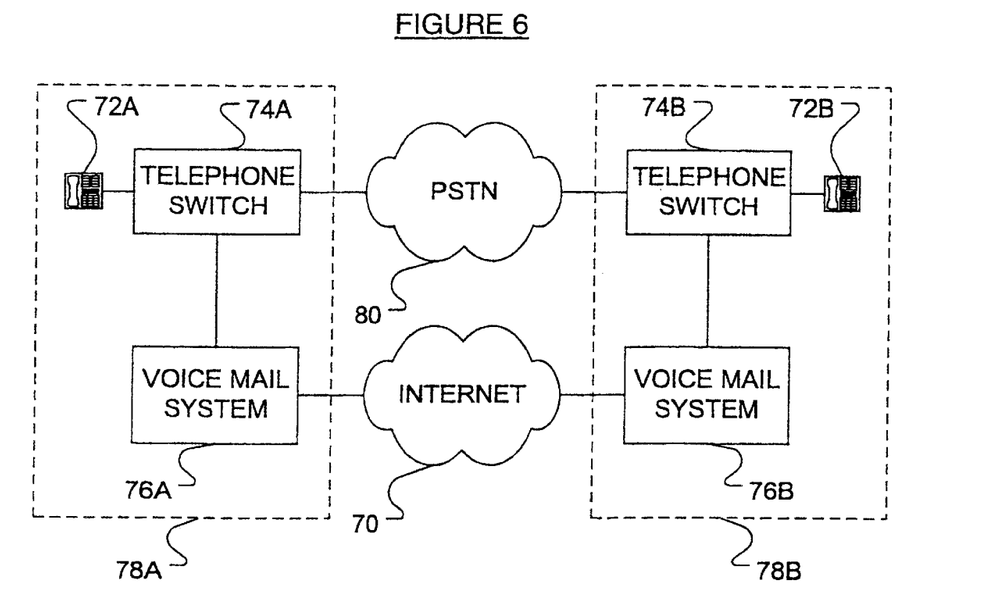
FIG. 6 is a schematic diagram of a local telephone system connected over a digital network and a public switched telephone network (PSTN) to a remote telephone system.

Referring to FIG. 6, which presents another aspect of this invention, the telephone switches 74A, 74B are connected through a Public Switched Telephone Network (PSTN) 80 while the voice mail systems 76A, 76B are connected through the Internet 70. A telephone system 78A, which may be considered the "local" system, comprises a telephone switch 74A connected to a telephone 72A, PSTN 80 and a local voice mail system 76A which is connected to the Internet 70. Similarly, a "remote" telephone system 78B comprises a telephone switch 74B connected to a telephone 72B, PSTN 80 and a voice mail system 76B which is connected to the Internet 70.

In overview, the operation of the system is as follows. A call placed from the local telephone 72A to a remote telephone 72B is passed to the local telephone switch 74A. [The local telephone switch 74A communicates the called number to the local voice mail system 76A which identifies the remote switch.] The local telephone switch 74A connects to the remote telephone switch 74B by means of the PSTN 80, with a request to connect to remote telephone 72B. The remote telephone switch 74B communicates the called number and an identification of the calling system 78A to the remote voice mail system 76B. The remote voice mail system 76B then communicates to the local voice mail system 76A over the Internet 70 the result of the attempt at connection to the remote telephone 72B. In response to a communication from the remote voice mail system 76B that the remote telephone 72B was busy or the called party did not answer the call, the local voice mail system 76A plays the greeting associated with the user of the remote telephone 72B appropriate to the result of the call. The local voice mail system 76A then records a message for the remote user and sends the message to the remote voice mail system 76B by means of the Internet 70.

In accordance with this embodiment of the present invention, the greetings associated with the users of the remote voice mail system 76B are stored by the local voice mail system 76A. This requires that a network of voice mail systems be established by creating a directory (FIG. 9) of voice mail systems with, for each system, the telephone numbers local to the system and the users' greetings associated with each number. This directory (FIG. 9) is initialized on each voice mail system in the network. The greetings could be broadcast over the digital network. Each voice mail system could maintain an up-to-date directory (FIG. 9) by a periodic broadcast of local greetings by each voice mail system to all other (remote) voice mail systems. Alternatively, each voice mail system might only broadcast the greetings of local users when changes are made.

Figure 7:
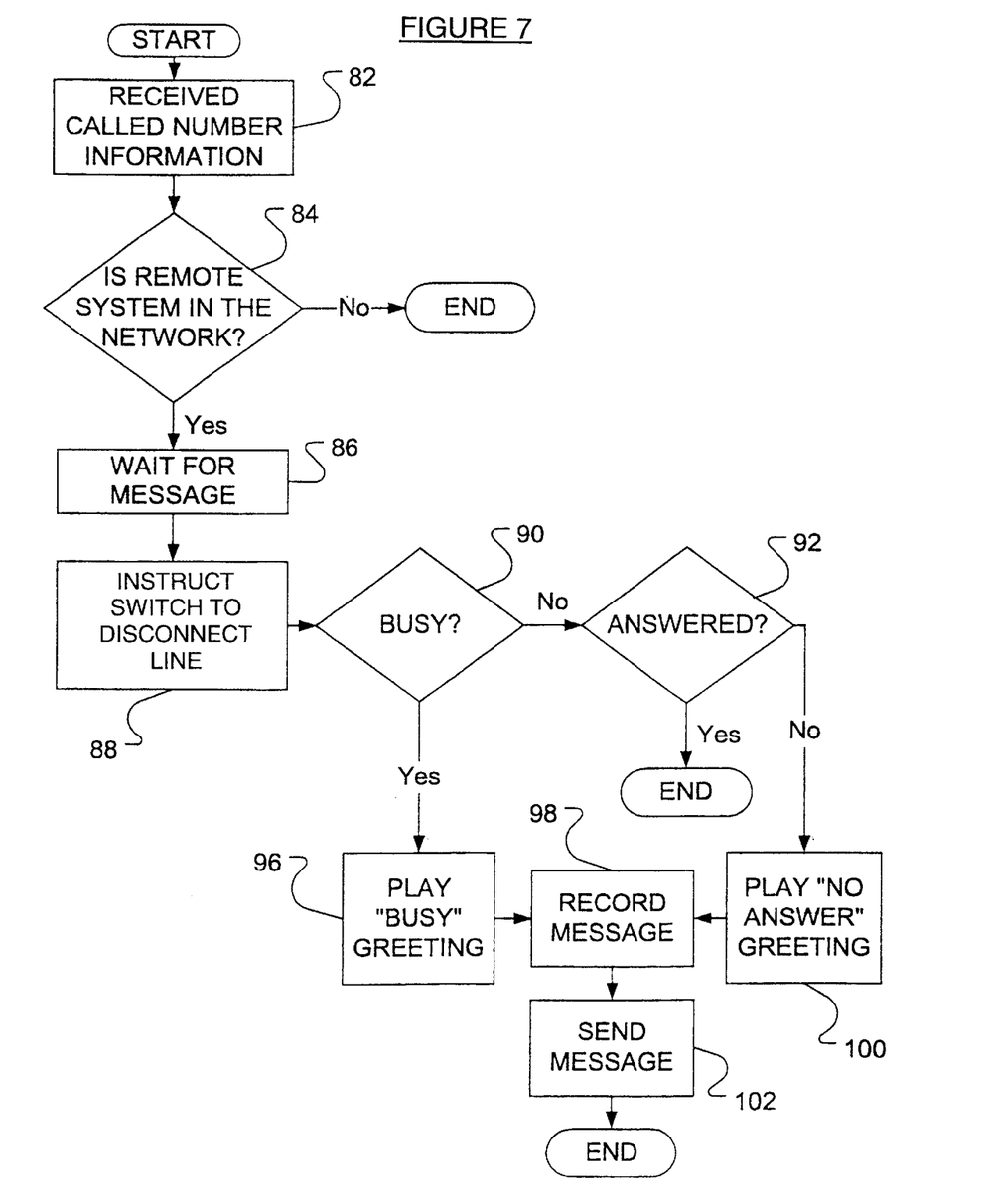
FIG. 7 is a flow diagram for the software control of an aspect of the local voice mail system of FIG. 6.
Figure 9:
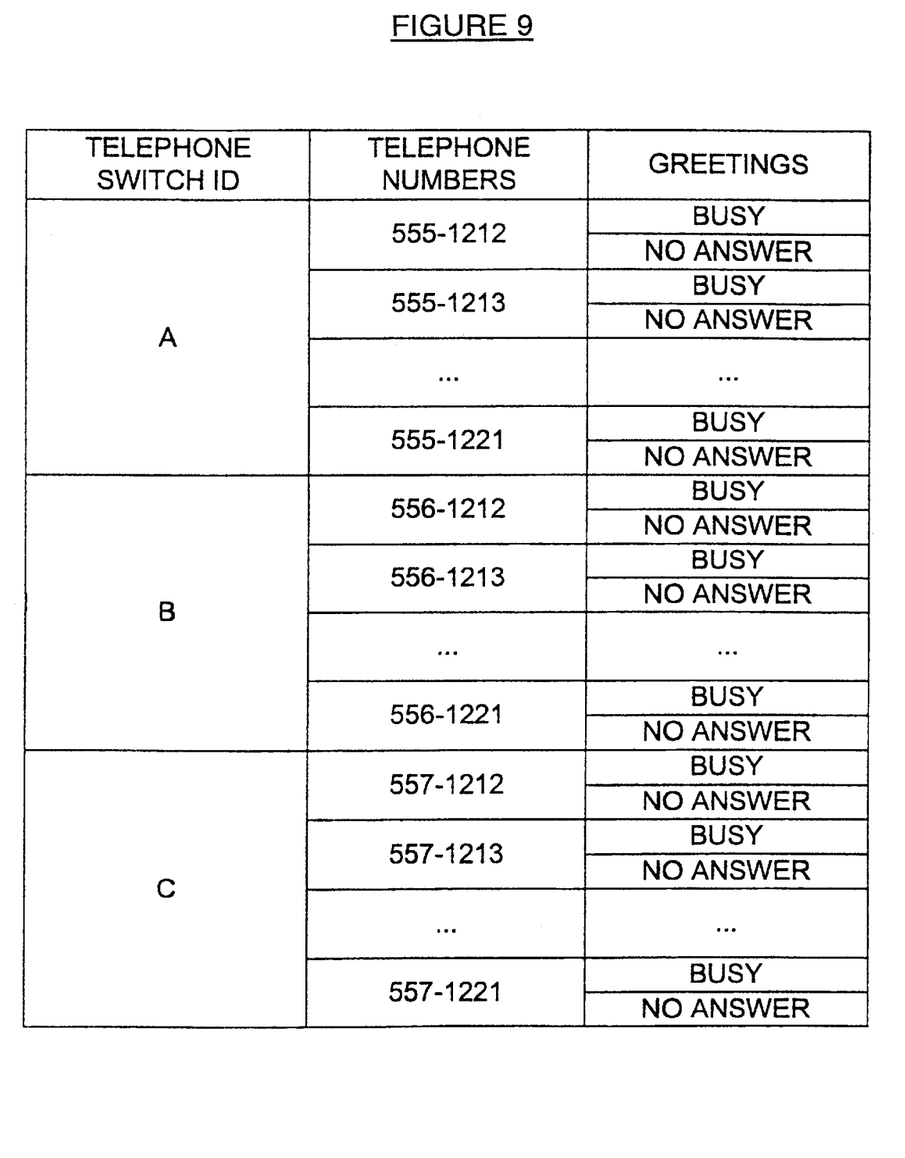
FIG. 9 is a directory of telephone switches and corresponding telephone numbers and greetings.

Referring to FIG. 7, there is illustrated in a flow diagram the logic followed by the local voice mail system 76A. Referring to FIG. 7 along with FIG. 6, the local voice mail system 76A receives a message from the local telephone switch 74A (step 82) when a call is placed indicating the called number. With this information, the local voice mail system 76A determines whether or not the remote voice mail system 76B is part of the network by checking (step 84) the directory (FIG. 9). If the remote voice mail system 76B is part of the network, the local voice mail system 76B retrieves from the directory (FIG. 9) the stored greetings associated with the called number (step 85), then waits for a message from the remote voice mail system 76B (step 86). If the remote voice mail system 76B is not known to the local voice mail system 76A, the call continues, but the local voice mail system 76A disassociates itself from the call.

Figure 8:
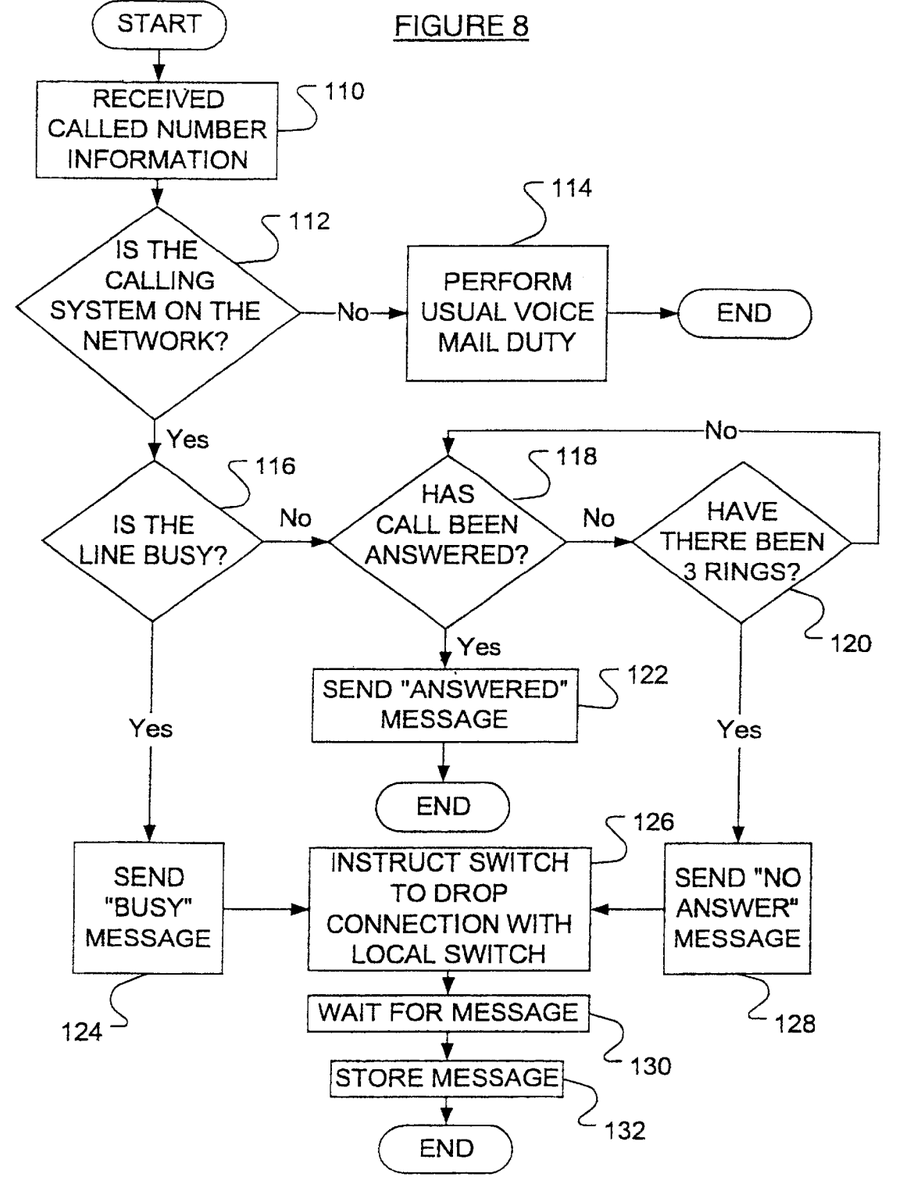
FIG. 8 is a flow diagram for the software control of an aspect of the remote voice mail system of FIG. 6.

Referring now to FIG. 8 along with FIG. 6, the remote telephone switch 74B passes to the remote voice mail system 76B both an identification of the calling telephone system 78A and the called number of an incoming call (step 110). By consulting a directory (FIG. 10) of networked voice mail systems, the remote voice mail system 76B determines whether the voice mail system which is part of calling telephone system 18A is part of the network (step 112).

In the event that the calling telephone system 18A is determined not to be part of the network, the remote voice mail system 76B assumes its normal task of monitoring the call, playing a greeting in response to an busy or ring-no-answer condition and recording and storing a message for the voice mail user (step 114).

Where the calling telephone system is determined to be part of the network, three conditions are possible. In the condition in which the call is answered, a message is then sent over the Internet 70 to the local voice mail system 76A to indicate that the call has been answered (step 122) and the monitoring by the remote voice mail system 76B stops. In the condition in which the remote telephone 72B is busy, the remote voice mail system 76B sends a message over the Internet 70 to the local voice mail system 76A to indicate that the called telephone 72B is busy (step 124). In the condition in which the remote telephone 72B goes unanswered after a predetermined number of rings the remote voice mail system 76B sends a message over the Internet 70 to the local voice mail system 76A to indicate that the remote telephone 72B was not answered (step 128). In a busy or no answer condition, the remote voice mail system then instructs the switch to drop the connection for the call (step 126).

After the remote voice mail system 76B has notified the local voice mail system 76A of a "busy" or a "no answer" condition, it then waits to receive a message recorded by the caller on the local voice mail system 76A (step 130).

Referring back to FIG. 7 in conjunction with FIG. 6, the local voice mail system 76A reacts to a busy or no answer message received from the remote voice mail system 76B by instructing the local telephone switch to disconnect the connection to the remote switch (step 87,88). In response to a message indicating that the remote telephone 72B was busy, the previously retrieved remote user's "busy" greeting is played (step 96), the local user's message is recorded (step 98) and the message is sent to the remote voice mail system 76B over the Internet 70 (step 102). In response to a message indicating that the remote telephone 72B was not answered, the previously retrieved remote user's "no answer" greeting is played (step 100), the local user's message is recorded (step 98) and the message is sent to the remote voice mail system 76B over the Internet (step 102). During the recording step (step 98), the local user may play back the message and modify it before the message is sent to the remote voice mail system 76B over the Internet 70 (step 102).

Referencing FIG. 8, the remote voice mail system 76B receives the message and stores the message in the appropriate voice mailbox (step 132).

Figure 11:
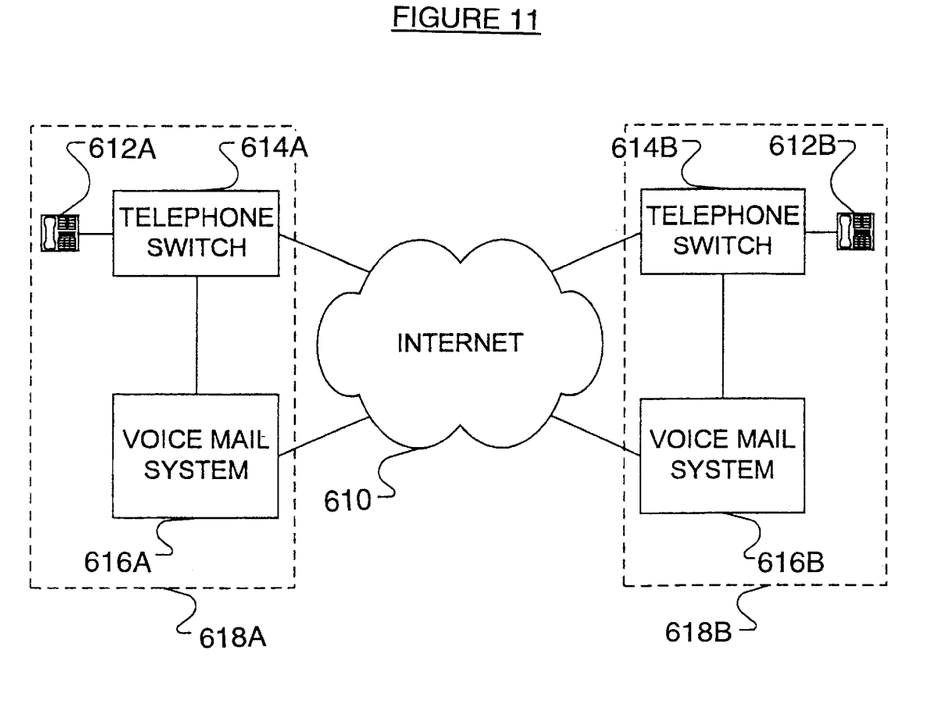
FIG. 11 is a schematic diagram of a local telephone system connected over a digital network to a remote telephone system.

Referring to FIG. 11, a telephone system 618A, which may be considered the "local" system, comprises a telephone switch 614A which is connected to a telephone 612A, the Internet 10 and a local voice mail system 616A which also has a connection to the Internet 610. Similarly, a remote telephone system 618B, comprises a telephone switch 614B connected to a telephone 612B, the Internet 610 and a remote voice mail system 616B which also has a connection to the Internet 610.

In overview, the operation of the system is as follows. A call placed from the local telephone 612A to the remote telephone 612B is passed to the local telephone switch 614A. The local (sending) telephone switch 614A connects to the remote (receiving) telephone switch 614B, by means of the Internet 610 using voice over IP technology, with a request to connect to remote telephone 612B. The local telephone switch 614A also communicates the called number, and optionally an identification of the remote system, to the local voice mail system 616A and the remote telephone switch 614B communicates the called number and an identification of the local system to the remote voice mail system 616B. In the event that the remote telephone 612B is busy or the called party does not answer the call, the remote voice mail system 616B uses the called number to access and play a greeting associated with the user of the remote telephone 612B. The Internet connection between telephone switches 614A, 614B in respect of the call from telephone 612A is then dropped. The identification of the local system allows the remote voice mail system 616B to communicate to the local voice mail system 616A over the Internet 610 the unsuccessful result of the attempt at connection to the remote telephone 612B. In response to this communication from the remote voice mail system 616B, that the remote telephone 612B is busy or the called party did not answer the call, the local voice mail system 616A records a message for the user of the remote voice mail system 616B and sends the message to the remote voice mail system 616B by means of the Internet 610.

In this embodiment of the invention, a directory (FIG. 10) is maintained in the memory of each of the voice mail systems which is populated only by references to those remote voice mail systems reachable through a digital network 610.

Figure 10:
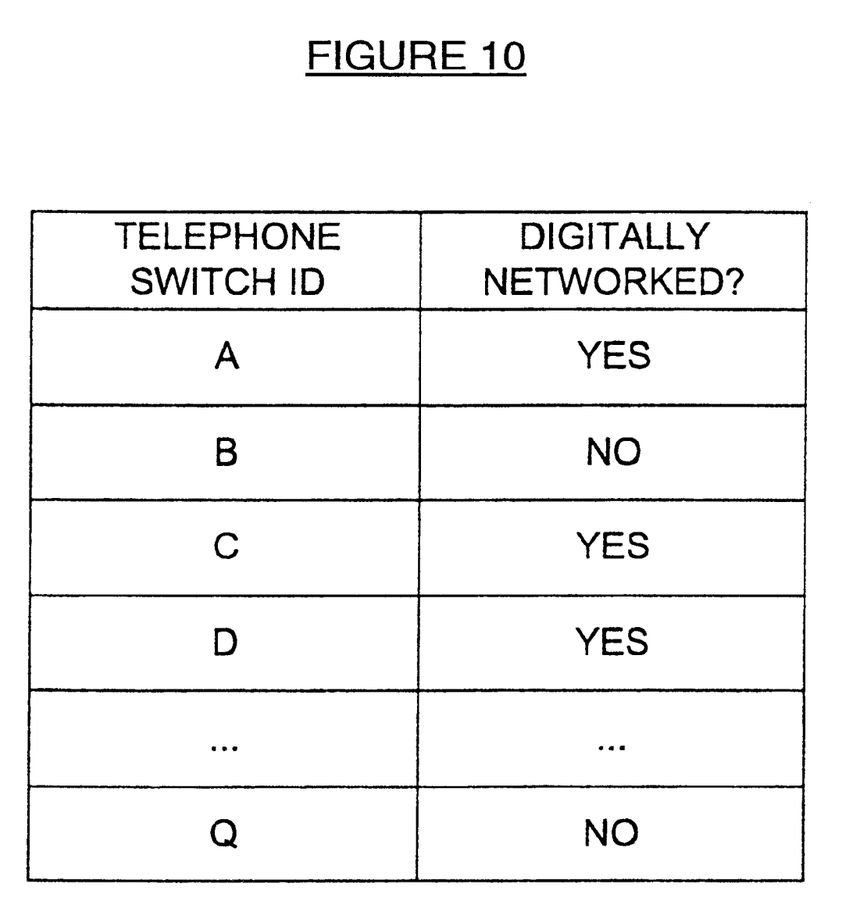
FIG. 10 is a directory of networked telephone switches.
Figure 12:
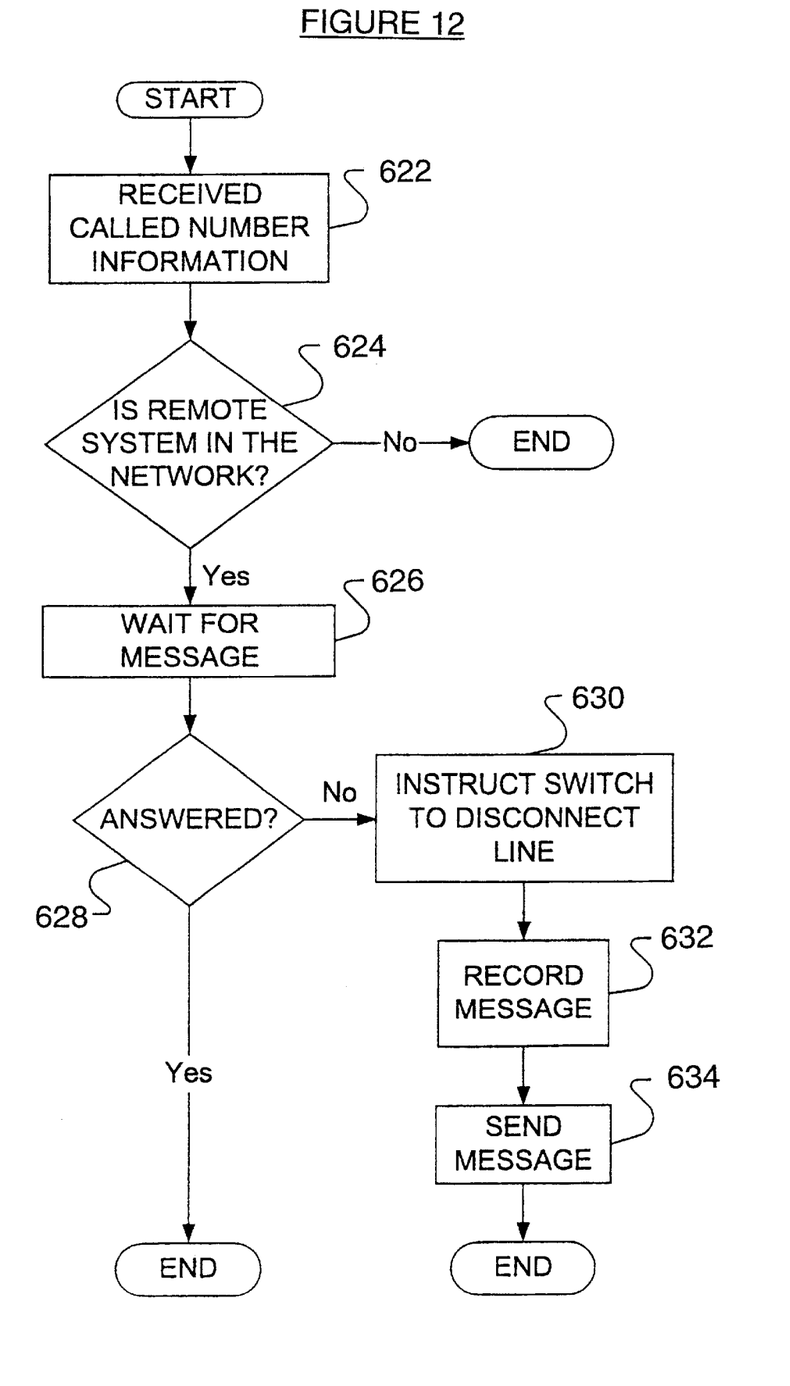
FIG. 12 is a flow diagram for the software control of the local voice mail system of FIG. 11.

Referring to FIG. 12, there is illustrated in a flow diagram the logic followed by the local voice mail system 616A in this embodiment. Referring to FIG. 12 along with FIG. 11, the local voice mail system 616A receives a called number message from the local telephone switch 614A (step 622) when a call is placed which identifies the remote system 618B (the exchange portion of the called number will normally indicate the remote system). The local voice mail system 616A determines whether or not the remote voice mail system 616B is part of the network by checking (step 624) the directory (FIG. 10). If the remote voice mail system 616B is part of the network, the local voice mail system 616A then waits for a message from the remote voice mail system 616B (step 626). If the remote voice mail system 616B is not known to the local voice mail system 616A, the call continues, but the local voice mail system 616A disassociates itself from the call.

Figure 13:
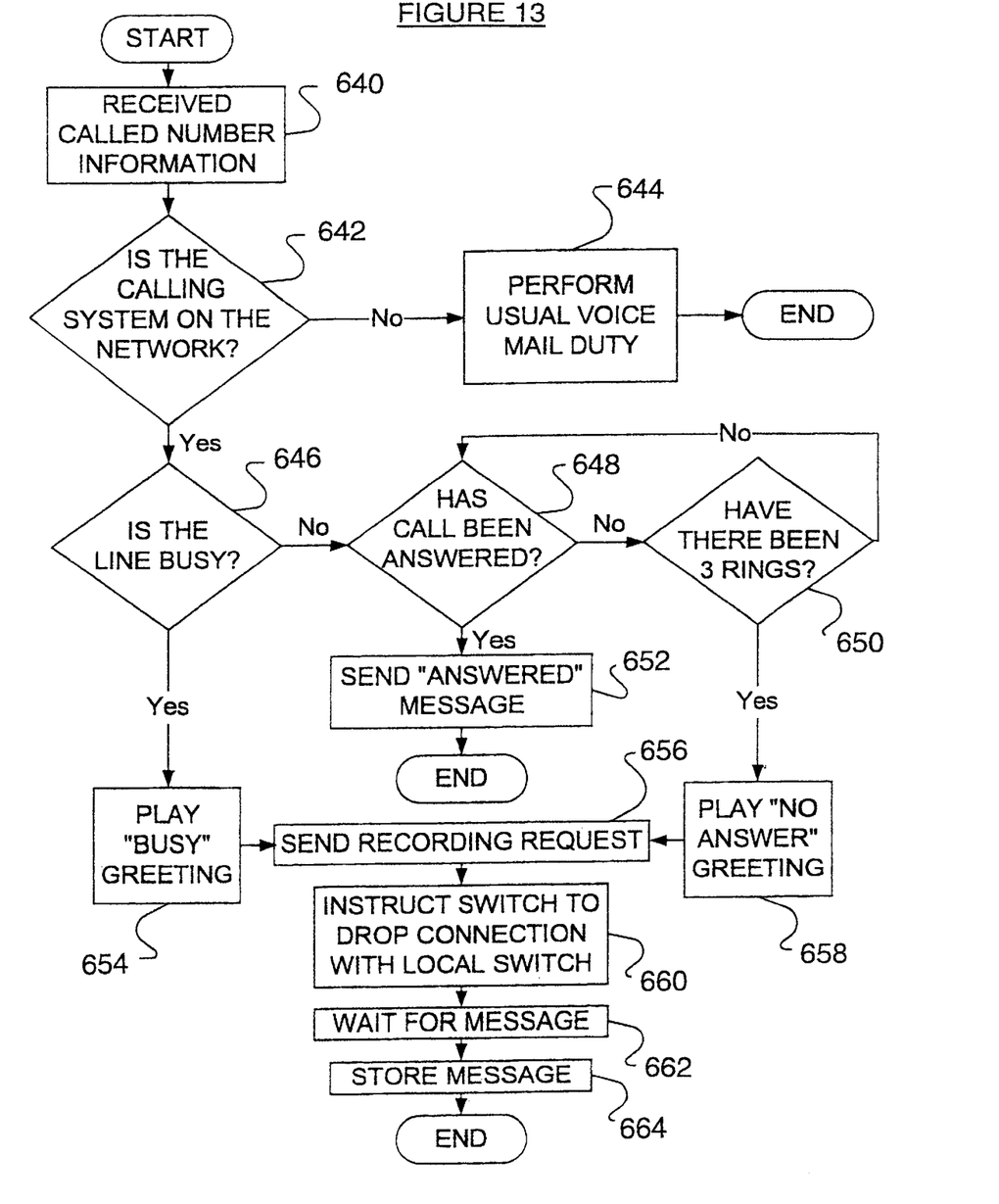
FIG. 13 is a flow diagram for the software control of the remote voice mail system of FIG. 11.

Referring now to FIG. 13 along with FIG. 11, the remote telephone switch 614B indicates to the remote voice mail system 616B both an identification of the calling system and the called number of an incoming call (step 640). By consulting a directory (FIG. 10) of networked voice mail systems, the remote voice mail system 616B determines whether the voice mail system which is part of calling telephone system 618A is part of the network (step 642).

In the event that the calling telephone system 618A is determined not to be part of the network, the remote voice mail system 616B assumes its normal task of monitoring the call, playing a greeting in response to an busy or no answer condition and recording and storing a message for the voice mail user (step 644).

Where the calling telephone system 618A is determined to be part of the network, three conditions are possible. In the condition in which the call is answered, a message is then sent over the Internet 610 to the local voice mail system 616A to indicate that the call has been answered (step 652) and the monitoring by the remote voice mail system 616B stops. In the condition in which the remote telephone 612B is busy, the remote voice mail system 616B plays the voice mail user's "busy" greeting (step 654). The remote voice mail system 616B then sends a message over the Internet 610 to the local voice mail system 616A to request that a message be recorded for the voice mail user of the remote telephone 612B (step 656). In the condition in which the remote telephone 612B goes unanswered after a predetermined number of rings the remote voice mail system 616B plays the voice mail user's "no answer" greeting (step 658). The remote voice mail system 616B then sends a message over the Internet 610 to the local voice mail system 616A to request that a message be recorded for the voice mail user of the remote telephone 612B (step 656).

After the remote voice mail system 616B has requested from the local voice mail system 616A to record a message, it prompts the remote switch 614B to drop its connection with the local switch 614A for the call (step 660), it then waits to receive the message recorded by the caller on the local voice mail system 616A (step 662).

Referring back to FIG. 12 in conjunction with FIG. 11, the local voice mail system 616A reacts to the message received from the remote voice mail system 616B as follows. In the event that the message from the remote voice mail system 616B indicates that the call was not answered (step 628), the local telephone switch 614A is instructed to disconnect the line (step 630), the local user's message is then recorded (step 632) and the message is sent to the remote voice mail system 616B over the Internet 610 (step 634). If the message from the remote voice mail system 616B indicates that the remote user has answered the phone, the local voice mail session is discontinued.

Returning to FIG. 13, the remote voice mail system 616B receives the message and stores the message in the appropriate voice mailbox (step 664).

The software control of FIGS. 7 and 8 could be used in conjunction with the network of FIG. 11 in place of the software control of FIGS. 12 and 13. Similarly, the software control of FIGS. 12 and 13 could be used in conjunction with the network of FIG. 6 in place of the software control of FIGS. 7 and 8. The advantage of the software control of FIGS. 12 and 13 in which the greetings associated with remote users are stored remotely has over the software control of FIGS. 7 and 8 in which the remote users' greetings are stored locally is the elimination of both the need for the local storage space necessary for greetings and the need to keep those greetings current. However, the software control of FIGS. 12 and 13 is less advantageous for the network of FIG. 6 because this would require a (brief) connection over the PSTN to play the remote user's greeting which could result in toll charges.

For each voice mail user in the above embodiments, there exists two greetings. One greeting is heard when the user's telephone is busy and another which is heard when the user fails to answer the telephone within a predetermined number or rings. One message could be played in both instances and it may be a voice mail standard greeting rather than a greeting specific to the user.

The decision boxes labelled 50 in FIG. 13 and 120 in FIG. 8 show a wait for three rings, but it will be appreciated that the wait can be set to last for any given number of rings.

While the embodiments have been described in conjunction with a voice telephone call, the described methods could be used for any type of messaging, such as video messaging.

Although FIGS. 6 and 11 show the Internet 10, 70 as the medium through which a voice mail message may be transferred, it could be another digital network such as a Wide Area Network (WAN).

Other modifications will be apparent to those skilled in the art and, therefore, the invention is defined in the claims.

What is claimed is:

1. A method of transferring a message from a calling party connected to a calling entity comprising a local telephone switch and a local voice mail system, to a called entity comprising a remote telephone switch and a remote voice mail system, said local and remote telephone switches being connected by a communications network such that common channel inter office signalling between the local and remote telephone switches is unsupported, and said local and remote voice message systems being connected by a data network, said method comprising the steps of:

initiating a call to a called party at the called entity over a communications channel from the local telephone switch to the remote telephone switch in the communications network;

identifying that the called party is not available;

sending information from the remote voice mail system to the local voice mail system over the data network to indicate that the called party is not available; and recording the message at the local voice mail system of the calling entity and after recording transmitting the message as a data message via a data channel in the data network for reception by the remote voice mail system.

2. The method of claim 1 further comprising the steps of:

determining whether the calling entity is capable of local recording and transmission of messages to the called entity; and where the called party is not available and where the calling entity is capable of local recording and transmission to the called entity, instructing the calling entity to perform the steps of recording and transmitting.

3. The method of claim 2 wherein the step of determining whether the local messaging system is capable of local recording and transmission of messages comprises determining whether the local messaging system is connected over a data network with the remote messaging system.

4. The method of claim 1 further comprising the steps of:

monitoring the call at the calling entity; and where the called party is not available and where the calling entity is capable of local recording and transmission to the called entity, performing the steps of recording and transmitting at the calling entity.

5. The method of claim 1, wherein greetings associated with the called parties are stored by the calling entity each of said greetings comprising an announcement that the associated called party is unavailable, and the method includes the step of playing a greeting at the calling entity.

6. The method of claim 5, where the greeting which is played is associated with the called party.

7. The method of claim 5, wherein the sending step comprises sending a signal indicating one of a busy and a no answer condition and wherein the greeting which is played is appropriate to the condition of the call.

8. The method of claim 1 including the step of, responsive to identifying that the called party is not available, dropping the call over the communications channel.

9. The method of claim 1, wherein greetings associated with the called parties are stored by the called entity each of said greetings comprising an announcement that the associated called party is unavailable, and the method includes the step of playing a greeting at the called entity.

10. The method of claim 9, wherein the greeting which is played is associated with the called party.

11. The method of claim 9, wherein the greeting which is played is appropriate to the condition of the call.

12. The method of claim 9 including the step of, at the called entity, responsive to the step of playing a greeting, prompting the called entity to drop a connection with the calling entity in respect of the call.

13. The method of claim 1 wherein the data message received via the data channel is stored at the called entity at a location indicated by the address of the called party.

14. The method of claim 1 wherein the data network is the internet.

15. The method of claim 1 wherein the message is a voice message.

16. The method of claim 1 wherein the message is a video message.

17. The method of claim 1, further comprising sending a signal to the calling entity which indicates an address of the called party to which the data message can be sent.

18. The method of claim 17 wherein the data message received via the data channel is stored at the called entity at a location indicated by the address of the called party.

19. The method of claim 1, wherein the call is initiated through a public switched telephone network.

20. The method of claim 1, wherein the call is initiated through a data network.

21. A messaging system for transferring a message from a calling party to a called party, said messaging system comprising:
- a calling entity, connected to the calling party and comprising a local telephone switch and a local voice mail system;
- a called entity connected to the called party and comprising a remote telephone switch and a remote voice mail system, said local and remote telephone switches being connected by a communications network such that common channel inter office signalling between the local and remote telephone switches is unsupported, and said local and remote voice message systems being connected by a data network; and wherein:
  - said local telephone switch is arranged to initiate a call to the called party at the called entity over a communications channel from the local telephone switch to the remote telephone switch in the communications network;
  - said remote telephone switch is arranged to identify that the called party is not available;
  - said remote voice mail system is arranged to send information to the local voice mail system via the data network to indicate that the called party is not available; and
  - said local voice mail system is arranged to record the message at the calling entity and after recording to transmit the recorded message as a data message via a data channel in the data network for reception by the called entity.

22. A method for handling an incoming call at a called entity, the call being from a calling party connected to a calling entity comprising a local telephone switch and a local voice mail system, said called entity comprising a remote telephone switch and a remote voice mail system, said local and remote telephone switches being connected by a communications network such that common channel inter office signalling between the local and remote telephone switches is unsupported, and said local and remote voice mail systems being connected by a data network, the method comprising the steps of:
- receiving the incoming call at the remote telephone switch in the called entity via the communications network;
- identifying that the called party is not available;
- sending information from the remote voice mail system to the local voice mail system via the data network to indicate that the called party is not available;
- receiving a data message via a data channel in the data network for reception by the called entity.

23. Apparatus for handling an incoming call at a called entity, the call being from a calling party connected to a calling entity comprising a local telephone switch and a local voice mail system, said apparatus comprising a remote telephone switch and a remote voice mail system, said local and remote telephone switches being connected by a communications network such that common channel inter office signalling between the local and remote telephone switches is unsupported, and said local and remote voice mail systems being connected by a data network, and wherein:
- said remote telephone switch is arranged to receive the incoming call at the called entity via the communications network;
- said remote telephone switch is arranged to identify that the called party is not available;
- said remote voice mail system is arranged to send information to the local voice mail system via the data network to indicate that the called party is not available;
- said remote voice mail system is also arranged to receive a data message via a data channel in the data network for reception by the called entity.

24. A method for handling an outgoing call from a calling party connected to a calling entity comprising a local telephone switch and a local voice mail system, the call being intended for a called party at a called entity comprising a remote telephone switch and a remote voice mail system, said local and remote telephone switches being connected by a communications network such that common channel inter office signalling between the local and remote telephone switches is unsupported, and said local and remote voice mail systems being connected by a data network, the method comprising the steps of:
- initiating a call to the called party at the called entity over a communications channel in the communications network and using the local telephone switch;
- receiving at the local voice mail system via the data network, information from the remote voice mail system indicating that the called party is not available;
- dropping the call with the called entity; and
- recording the message at the calling entity and after recording transmitting the message as a data message via a data channel in the data network for reception by the called entity.

25. The method of claim 24, further comprising the step of playing a greeting, at the calling entity, said greeting being a greeting of the called party.

26. Apparatus for handling an outgoing call from a calling party at a calling entity, the call being intended for a called party at a called entity comprising a remote telephone switch and a remote voice mail system, the apparatus comprising:
- a local telephone switch which is part of the calling entity and which is arranged to initiate a call to the called party, said local telephone switch being connected to the remote telephone switch via a communications network such that common channel inter office signalling between the local and remote telephone switches is unsupported;
- a local voice mail system which is part of the calling entity and which is arranged to receive information indicating that the called party is not available from a remote voice mail system that is part of the called party, said information being received via a data network which connects the local and remote voice mail systems; and wherein:
  - the local telephone switch is arranged to drop the call with the called entity; and
  - the local voice mail system is arranged to record the message at the calling entity and after recording transmit the message as a data message via a data channel in the data network for reception by the called entity.

* * * * *